US012759332B2

(12) United States Patent
Kim et al.

(10) Patent No.: US 12,759,332 B2
(45) Date of Patent: Oct. 13, 2026

(54) ETCHING PLATE, METHOD OF FABRICATING WINDOW USING THE SAME, AND WINDOW FABRICATED USING THE SAME

(71) Applicant: Samsung Display Co., LTD., Yongin-si (KR)

(72) Inventors: Jun Young Kim, Yongin-si (KR); Dong Ho Kim, Yongin-si (KR); Ju Suk Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 142 days.

(21) Appl. No.: 18/507,207

(22) Filed: Nov. 13, 2023

(65) Prior Publication Data

US 2024/0326498 A1 Oct. 3, 2024

(30) Foreign Application Priority Data

Mar. 31, 2023 (KR) ........................ 10-2023-0042810

(51) Int. Cl.
*B41M 1/10* (2006.01)

(52) U.S. Cl.
CPC .................................... *B41M 1/10* (2013.01)

(58) Field of Classification Search
None
See application file for complete search history.

(56) References Cited

U.S. PATENT DOCUMENTS

2015/0125662 A1* 5/2015 Kim ......................... B41M 1/00
427/256

FOREIGN PATENT DOCUMENTS

| | | |
|---|---|---|
| JP | 2006231827 A * | 9/2006 |
| KR | 10-0663398 | 1/2007 |
| KR | 10-1189752 | 10/2012 |

OTHER PUBLICATIONS

JP2006231827A Machine Translation via EPO (Year: 2006).*

* cited by examiner

*Primary Examiner* — Laura C Powers
(74) *Attorney, Agent, or Firm* — Sughrue Mion, PLLC

(57) ABSTRACT

An etching plate includes a first intaglio pattern portion spaced apart from an edge portion of the etching plate and having a first depth, and a second intaglio pattern portion adjacent to the first intaglio pattern portion, and having a second depth greater than the first depth of the first intaglio pattern portion.

6 Claims, 7 Drawing Sheets

ETCHING PLATE, METHOD OF FABRICATING WINDOW USING THE SAME, AND WINDOW FABRICATED USING THE SAME

CROSS-REFERENCE TO RELATED APPLICATION(S)

This application claims priority to and benefits of Korean Patent Application No. 10-2023-0042810 under 35 U.S.C. § 119, filed on Mar. 31, 2023, in the Korean Intellectual Property Office, the entire contents of which are incorporated herein by reference.

BACKGROUND

1. Technical Field

Embodiments relate to an etching plate, a method of fabricating a window by using the etching plate, and a window fabricated by using the etching plate.

2. Description of the Related Art

To protect display modules from external impacts, display devices include windows attached to the display modules. Providing external surfaces of the display devices, the windows may also directly influence the designs of apparatuses including the display devices.

Therefore, to not only provide the function of protecting the display modules but also provide various designs to the display devices, printed pattern layers may be formed in the windows. For example, the printed pattern layers may be formed on the windows by transferring ink on a base substrate by using a pad.

SUMMARY

Embodiments are directed to a method of fabricating an etching plate capable of preventing removal of ink (or a printed pattern layer), a method of fabricating a window by using the etching plate, and a window fabricated by using the etching plate.

Furthermore, embodiments are directed to an etching plate capable of preventing a void from occurring during a lamination process of attaching a window to a display module, a method of fabricating the window by using the etching plate, and the window fabricated by using the etching plate.

However, embodiments of the disclosure are not limited to those set forth herein. The above and other embodiments will become more apparent to one of ordinary skill in the art to which the disclosure pertains by referencing the detailed description of the disclosure given below.

According to an embodiment, an etching plate may include a first intaglio pattern portion spaced apart from an edge portion of the etching plate and having a first depth, and a second intaglio pattern portion adjacent to the first intaglio pattern portion, and having a second depth greater than the first depth of the first intaglio pattern portion.

The width of the first intaglio pattern portion may be substantially equal to the width of an inner bezel area of a window, and the width of the second intaglio pattern portion may be substantially equal to the width of an outer bezel area of the window.

The etching plate may further include a third intaglio pattern portion formed between the first intaglio pattern portion and the second intaglio pattern portion and inclined at an angle.

The sum of the width of the first intaglio pattern portion and the width of the third intaglio pattern portion is substantially equal to the width of an inner bezel area of a window, and the width of the second intaglio pattern portion is substantially equal to the width of an outer bezel area of the window.

The first depth may be in a range of about 10 μm to about 20 μm, and the second depth may be in a range of about 20 μm to about 30 μm.

The angle may be less than 90°.

According to an embodiment, a window including a transmission area and a bezel area may include a base substrate and a printed pattern layer disposed on the base substrate and overlapping the bezel area. The printed pattern layer may include a first printed pattern layer overlapping an inner bezel area included in the bezel area and having a first thickness, and a second printed pattern layer overlapping an outer bezel area included in the bezel area and having a second thickness greater than the first thickness of the first printed pattern layer.

The printed pattern layer may include a third printed pattern layer formed between the first printed pattern layer and the second printed pattern layer and inclined at an angle.

A central portion of the base substrate may be planar. A peripheral portion of the base substrate may be planar or curved.

The angle may be less than 90°.

According to an embodiment, a method of fabricating a window including a transmission area and a bezel area may include charging printing ink into an etching plate including a first intaglio pattern portion spaced apart from an edge portion and having a first depth, and a second intaglio pattern portion adjacent to the first intaglio pattern portion and having a second depth greater than the first depth of the first intaglio pattern portion, attaching the printing ink to a pad by pressing the pad onto the etching plate and pressing the pad to which the printing ink is attached onto a base substrate fixed by a jig; and printing a printed pattern layer on the base substrate to overlap the bezel area.

The printed pattern layer may include a first printed pattern layer overlapping an inner bezel area included in the bezel area and formed by transferring the printing ink charged in the first intaglio pattern portion and a second printed pattern layer overlapping an outer bezel area included in the bezel area and formed by transferring the printing ink charged in the second intaglio pattern portion.

The thickness of the second printed pattern layer is greater than the thickness of the first printed pattern layer.

The etching plate may further include a third intaglio pattern portion formed between the first intaglio pattern portion and the second intaglio pattern portion and inclined at an angle.

The printed pattern layer may include a first printed pattern layer overlapping at least a portion of an inner bezel area included in the bezel area, and formed by transferring the printing ink charged in the first intaglio pattern portion, a second printed pattern layer overlapping an outer bezel area included in the bezel area and formed by transferring the printing ink charged in the second intaglio pattern portion and a third printed pattern layer overlapping at least a portion of the inner bezel area and formed by transferring the printing ink charged in the third intaglio pattern portion.

The third printed pattern layer may be formed between the first printed pattern layer and the second printed pattern layer, and may be inclined at the angle.

The angle may be less than 90°.

A central portion of the base substrate may be planar. A peripheral portion of the base substrate may be planar or curved.

The charging of the printing ink into an etching plate, the attaching of the printing ink to the pad, and the printing of the printed pattern layer on the base substrate may be repeated once.

The first depth may be in a range of about 10 μm to about 20 μm, and the second depth may be in a range of about 20 μm to about 30 μm.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
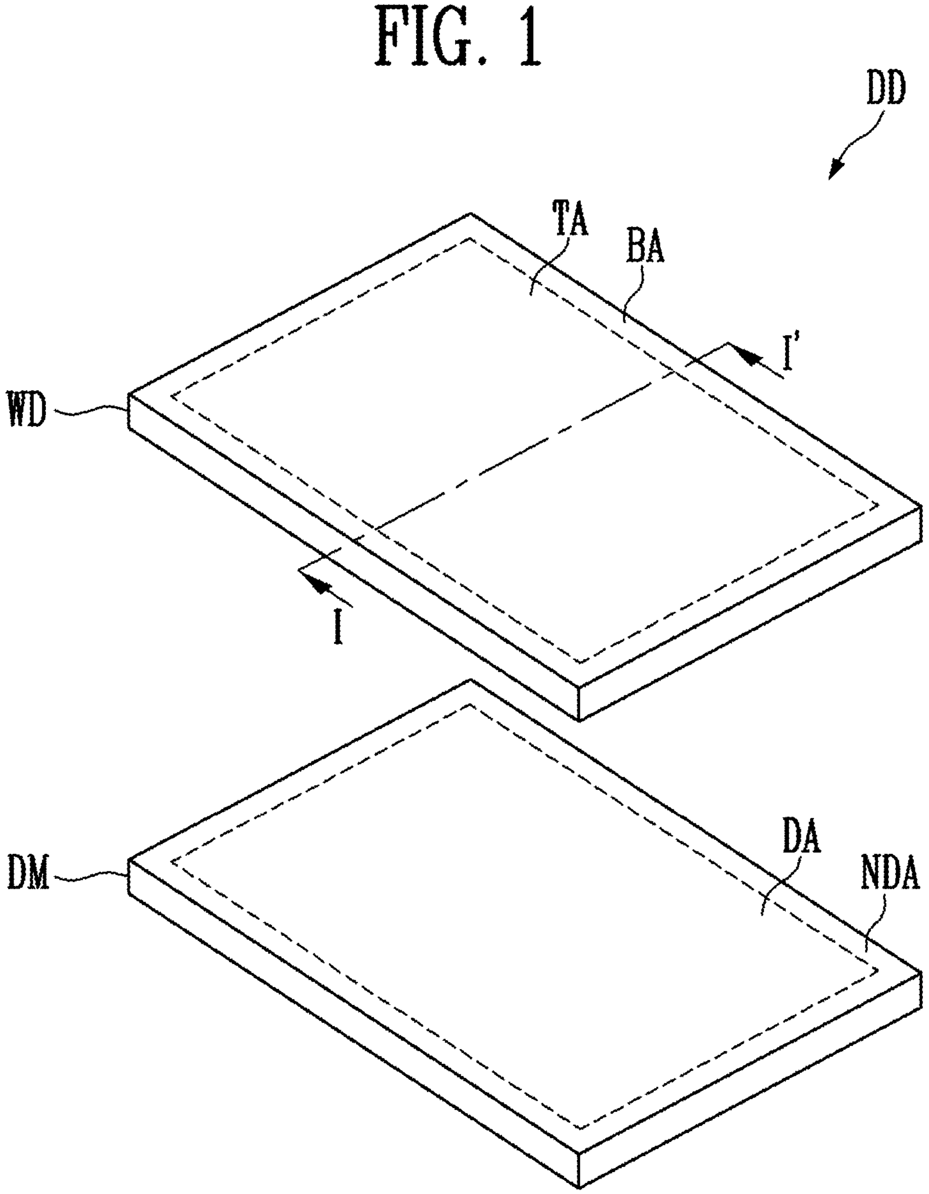
FIG. 1 is a schematic diagram of a display device.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the X, Y, and Z-axes, and may be interpreted in a broader sense. For example, the DR1-axis, the DR2-axis, and the DR3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention. Hereinafter, embodiments of the disclosure will be described in detail with reference to the accompanying drawings. FIG. 1 is a schematic diagram of a display device DD.

Referring to FIG. 1, the display device DD may include a window WD and a display module DM.

The display device DD may be used as a display screen for portable electronic devices such as a mobile phone, a smart phone, a tablet personal computer (PC), a mobile communication terminal, an electronic note, an electronic book, a portable multimedia player (PMP), a navigation device, and an ultra mobile PC (μMPC). For example, the display device DD may be used as a display screen for various products such as a television, a notebook, a monitor, an advertisement panel, and an internet of things (IOT).

The window WD may form the appearance of the display device DD. The window WD may be disposed on a front surface of the display module DM to protect the display module DM. An image displayed on the display module DM may be visible to a user through the window WD.

Figure 9:
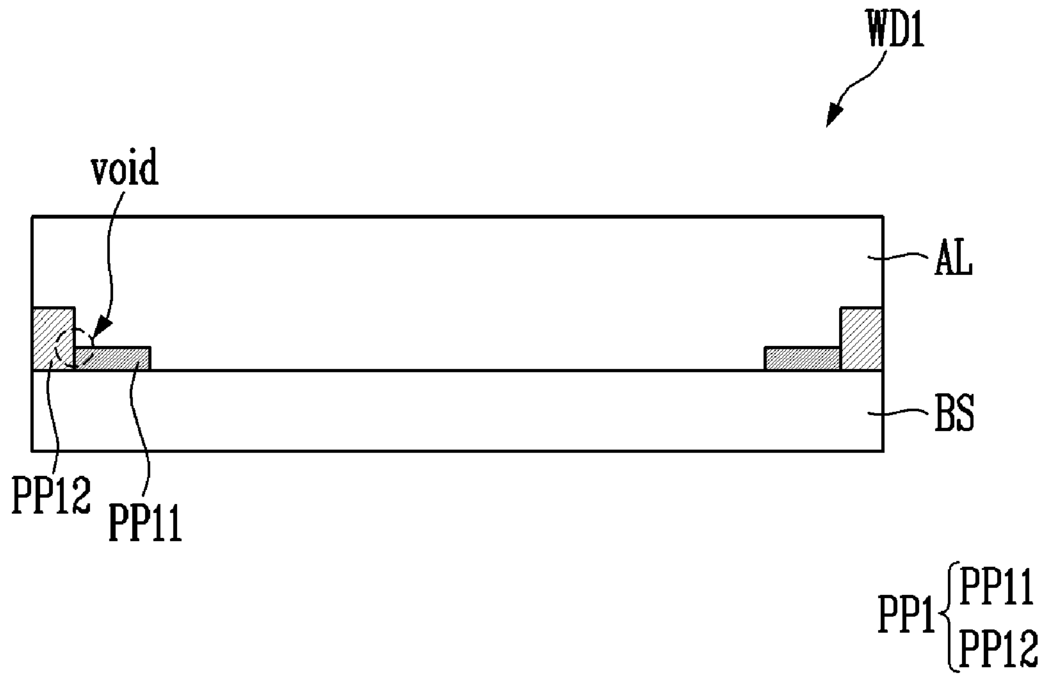

The window WD may be attached to the display module DM by an adhesive layer AL (refer to FIG. 9). For example, the adhesive layer AL may include an adhesive component such as an optical clear adhesive (OCA) or a pressure sensitive adhesive (PSA).

The window WD may include an optically transparent insulating material. For example, the window WD may include glass or plastic. The window WD may be formed in a multilayer structure or a single-layer structure.

The window WD may include a transmission area TA and a bezel area BA.

The transmission area TA may be an area that passes (or transmits) incident light therethrough. The transmission area TA may have a shape corresponding to the display area DA of the display module DM. For example, the transmission area TA may overlap the overall surface or at least a portion of the display area DA of the display module DM. An image displayed in the display area DA of the display module DM may be visible to the outside through the transmission area TA.

The bezel area BA may be an area having optical transmittance lower than that of the transmission area TA. The bezel area BA may define the shape of the transmission area TA. The bezel area BA may be adjacent to the transmission area TA and may enclose (or surround) the transmission area TA.

The bezel area BA may have a certain color determined by a printed pattern layer PP (refer to FIG. 2) to be described below. The bezel area BA may have a shape corresponding to a non-display area NDA of the display module DM. For example, the bezel area BA may overlap the overall surface or at least a portion of the non-display area NDA of the display module DM. The bezel area BA may cover the non-display area NDA of the display module DM to prevent the non-display area NDA from being visible to the outside.

The display module DM may display an image on the front surface thereof. The display module DM may be an emissive display panel. For example, the display module DM may be an organic light emitting display panel, a quantum dot light emitting display panel, a micro-LED display panel, or a nano-LED display panel.

The display module DM may include a display area DA and a non-display area NDA.

The display area DA may be an area in which an image is displayed. Pixels may be disposed in the display area DA to display an image.

The non-display area NDA may be an area in which an image is not displayed. The non-display area NDA may define the shape of the display area DA. The non-display area NDA may be adjacent to the display area DA, and may enclose (or surround) the display area DA. At least one pad, at least one line, and the like may be disposed in the non-display area NDA to drive the pixels.

Figure 2:
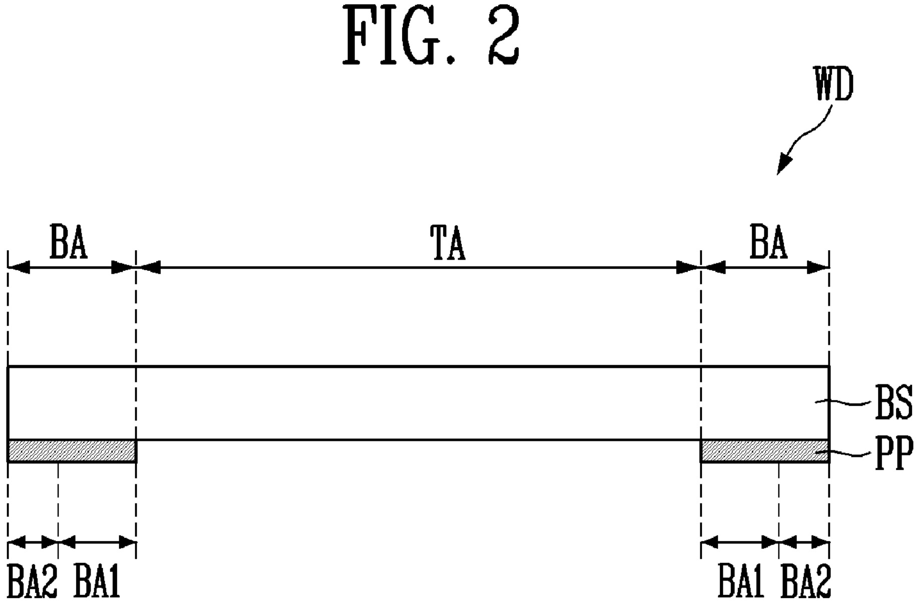
FIG. 2 is a schematic diagram of a window of the display device of FIG. 1.

FIG. 2 is a schematic diagram of the window WD. FIG. 2 is a schematic sectional view of the window WD taken along line I-I' of FIG. 1.

Referring to FIG. 2, the window WD may include a base substrate BS and a printed pattern layer PP.

The base substrate BS may be formed of an optically transparent insulating material. For example, the base substrate BS may be formed as a glass substrate or a plastic substrate. In the case where the base substrate BS is formed as a plastic substrate, the base substrate BS may include a polymeric material. For example, the base substrate (BS) may be made of materials such as polyimide (PI), polyacrylate (PA), polymethylmethacrylate (PMMA), polycarbonate (PC), polyethylenenaphthalate (PEN), polyvinylidene chloride (PVC), polyvinylidene difluoride (PVDF), polystyrene (PS), ethylene vinylalcohol copolymer, or a combination thereof.

As illustrated in FIG. 1, a central portion and a peripheral portion of the base substrate BS may be planar and may have a flat surface. However, embodiments are not limited to the foregoing example, and the central portion of the base substrate BS may be planar and may have a flat surface, and the peripheral portion thereof may be curved or bent.

The printed pattern layer PP may be disposed on a portion of the base substrate BS that corresponds to the bezel area BA. The printed pattern layer PP may overlap the bezel area BA. The printed pattern layer PP may be formed of an organic light-blocking material or an inorganic light-blocking material that includes a black pigment or a black dye. For example, the printed pattern layer PP may include carbon black or the like. However, embodiments are not limited to the foregoing example, and the printed pattern layer PP may be formed of an organic light-blocking material or an inorganic light-blocking material including a colored pigment or dye. The color of the printed pattern layer PP may be defined as the color of the bezel area BA.

In an embodiment, the bezel area BA may include an inner bezel area BA1 and an outer bezel area BA2.

The inner bezel area BA1 may be an area adjacent to the transmission area TA. The inner bezel area BA may be an area between the transmission area TA and the outer bezel area BA2. The inner bezel area BA1 may be defined as an area where a defect caused by removal (or detachment) of the printed pattern layer PP is not occurred or is merely slight or mild. For example, a defect rate caused by the removal (or detachment) of the printed pattern layer PP overlapping the inner bezel area BA1 may be very low.

The outer bezel area BA2 may be an area with a side surface adjacent to the inner bezel area BA1, and another side surface exposed to the outside. The outer bezel area BA2 may be defined as an area where there may be a significant defect caused by removal (or detachment) of the printed pattern layer PP to be described below. For example, a defect rate caused by the removal (or detachment) of the printed pattern layer PP overlapping the outer bezel area BA2 may be very high.

FIGS. 3 to 6 are schematic diagrams for describing a process of fabricating the window WD. The window WD may be fabricated by a filing process S100, an attachment process S200, and a transfer process S300.

Figure 3:
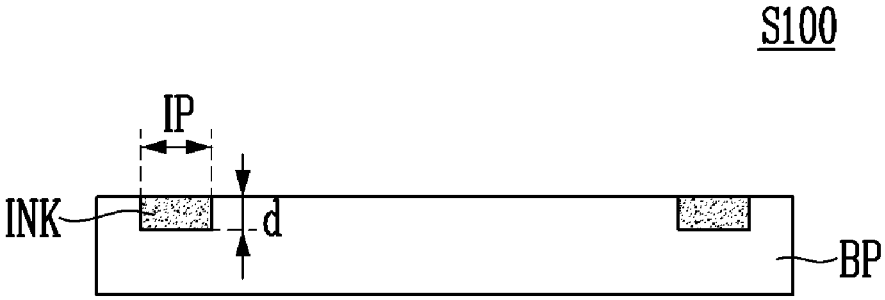
FIGS. 3, 4, 5 and 6 are schematic diagrams for describing a process of fabricating the window of FIG. 2.

Referring to FIG. 3, during the filling process S100, printing ink INK may be charged into an etching plate BP. The etching plate BP may include an intaglio pattern portion (e.g., concaved pattern portion or recessed pattern portion) IP corresponding to the shape of the printed pattern layer PP (refer to FIG. 6) to be printed on the base substrate BS. The intaglio pattern portion IP may be spaced apart from an edge portion of the etching plate BP, and may be formed to a certain depth d. Depending on the depth d of the intaglio pattern portion IP, a thickness t (refer to FIG. 6) of the printed pattern layer PP may be determined. The printing ink INK may be charged into the intaglio pattern portion IP. The printing ink INK may form the printed pattern layer PP including the above-mentioned light-blocking material.

Figure 4:
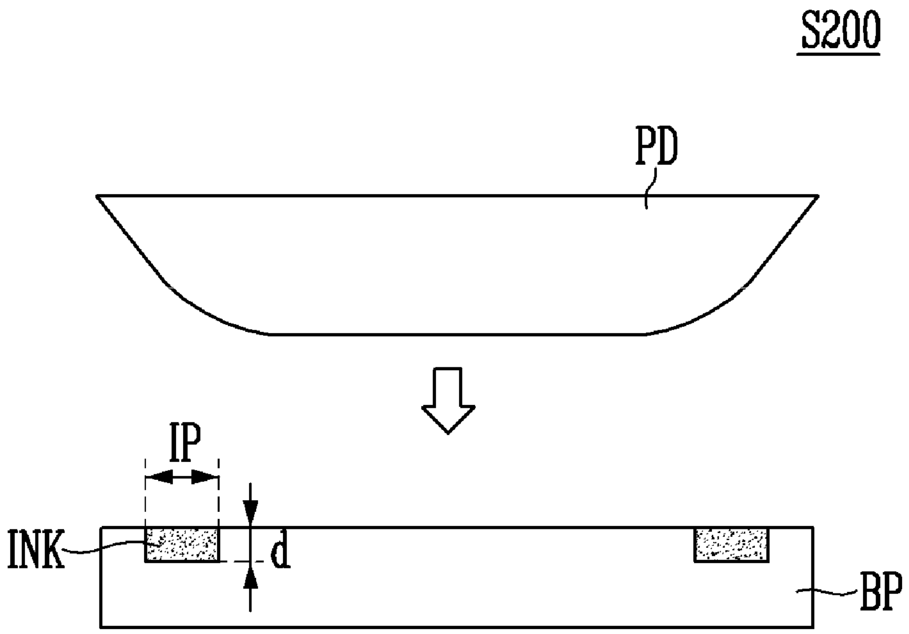

Referring to FIG. 4, during the attachment process S200, a pad PD may be pressed onto the etching plate BP filled with the printing ink INK. Therefore, the printing ink INK may be attached to the pad PD.

Figure 5:
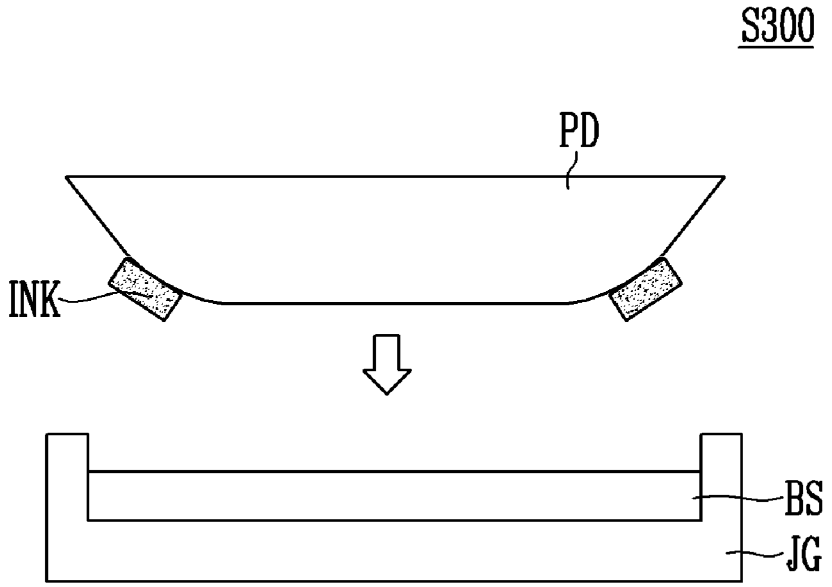

Referring to FIG. 5, during the transfer process S300, the pad PD to which the printing ink INK is attached may be pressed onto the base substrate BS. A jig JG may be a device for securing/fixing a printing target, and may function to secure/fix the base substrate BS. Thus, the printing ink INK may be transferred onto the base substrate BS, thus forming the printed pattern layer PP (refer to FIG. 6). After the transfer process S300, a dry process of drying the printed pattern layer PP may be performed.

Figure 6:
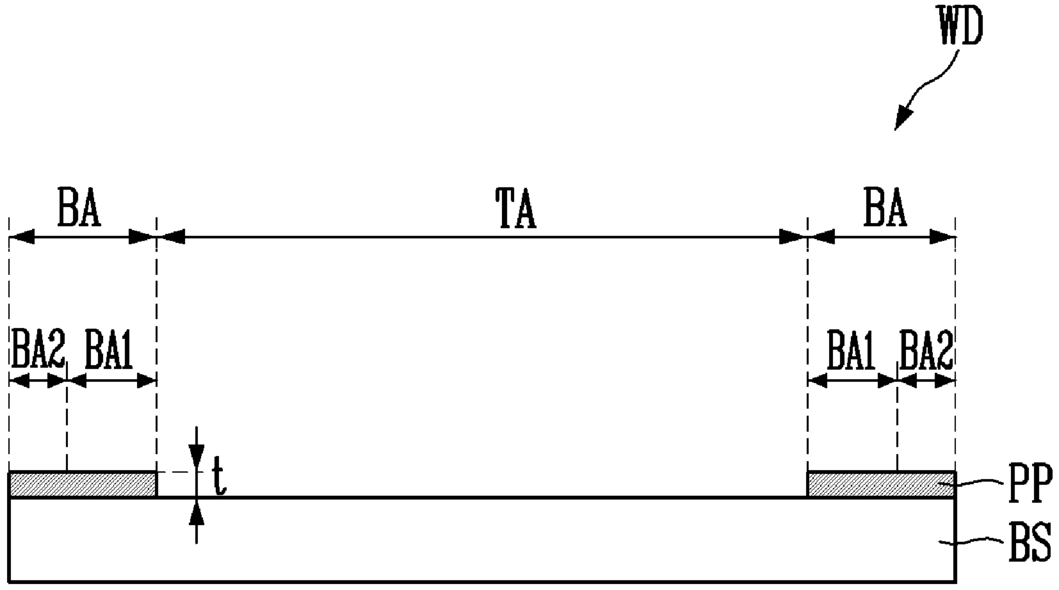

Referring to FIG. 6, the window WD including the base substrate BS and the printed pattern layer PP may be fabricated by the filling process S100, the attachment process S200, and the transfer process S300. The printing ink INK may be transferred onto the portion of the base substrate BS that corresponds to the bezel area BA so that the printed pattern layer PP overlapping the bezel area BA may be formed.

In case that the filling process S100, the attachment process S200, and the transfer process S300 are performed twice, in other words, in case that the filling process S100, the attachment process S200, and the transfer process S300 are repeated once, it may be defined as a single tone printing process. In the case where the single tone printing process is performed, the printed pattern layer PP having the certain thickness t may be formed. The thickness t of the printed pattern layer PP may be formed by transferring the printing ink INK charged into the intaglio pattern portion IP having the certain depth d by the single tone printing process.

A double tone printing process may be defined by repeating the single tone printing process once. In the case where the double tone printing process is performed, there is formed a printed pattern layer having a thickness greater than the thickness t of the printed pattern layer PP formed by the single tone printing process. For example, to reduce the production cost, it may be desirable to fabricate the window WD through the single tone printing process. However, in the case where the single tone printing process is performed, the thickness t of the printed pattern layer PP that is relatively thin may lead to a reduction in rigidity of the printed pattern layer PP. Thus, the printed pattern layer PP that overlaps the outer bezel area BA2 vulnerable to interference may be removed or detached, so that the defect rate may be increased.

Figure 7:
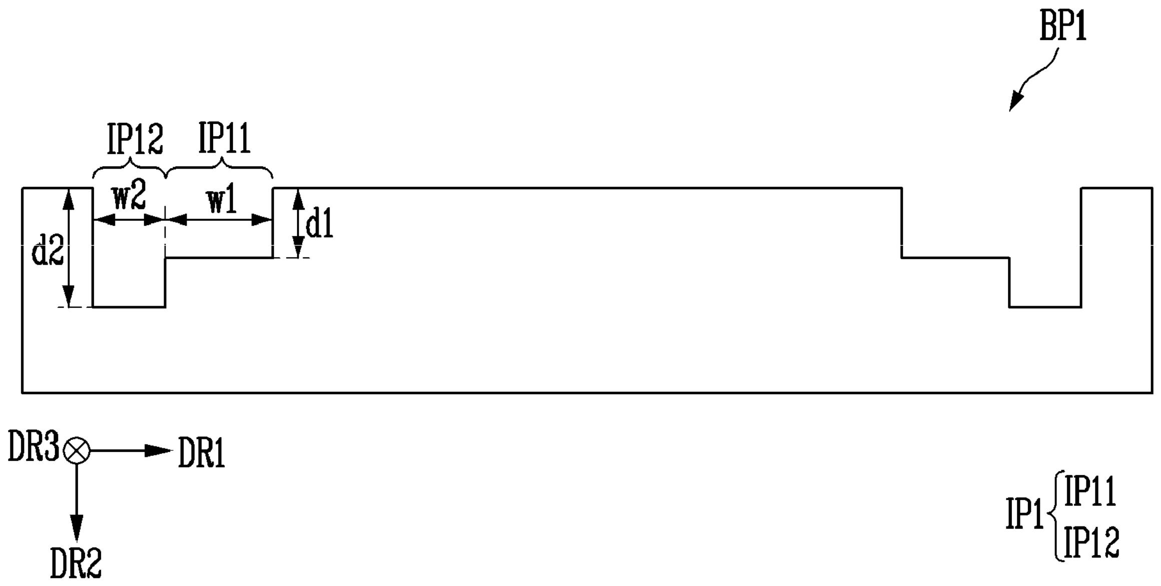
FIG. 7 is a schematic diagram of an etching plate in accordance with an embodiment.

FIG. 7 is a schematic diagram of an etching plate BP1 in accordance with an embodiment.

Referring to FIG. 7, the etching plate BP1 in accordance with an embodiment may include a stepped intaglio pattern portion IP1. The intaglio pattern portion IP1 may include a first intaglio pattern portion IP11 and a second intaglio pattern portion IP12.

The first intaglio pattern portion IP11 may have a width w1 defined in a first direction DR1, and a depth d1 defined in a second direction DR2, and may extend in a third direction DR3. The first intaglio pattern portion IP11 may be formed at a position spaced apart from an edge portion of the etching plate BP1 by a certain distance.

The width w1 of the first intaglio pattern portion IP11 may be the same as a width of a first printed pattern layer PP11 (refer to FIG. 8) that overlaps the inner bezel area BA1. The width w1 of the first intaglio pattern portion IP11 may be the same as a width of the inner bezel area BA1.

In an embodiment, the depth d1 of the first intaglio pattern portion IP11 may be in a range of about 10 μm to about 20 μm. In an embodiment, the depth d1 of the first intaglio pattern portion IP11 may be about 15 μm.

The second intaglio pattern portion IP12 may be formed to be adjacent to the first intaglio pattern portion IP11. The second intaglio pattern portion IP12 may have a width w2 defined in the first direction DR1, and a depth d2 defined in the second direction DR2, and may extend in the third direction DR3. The second intaglio pattern portion IP12 may be formed at a position spaced apart from an edge portion of the etching plate BP1 by a certain distance.

The width w2 of the second intaglio pattern portion IP12 may be the same as a width of a second printed pattern layer PP12 (refer to FIG. 8) that overlaps the outer bezel area BA2. The width w2 of the second intaglio pattern portion IP12 may be the same as a width of the outer bezel area BA2.

In an embodiment, the depth d2 of the second intaglio pattern portion IP12 may be greater than the depth d1 of the first intaglio pattern portion IP11. For example, the depth d2 of the second intaglio pattern portion IP12 may be in a range of about 20 μm to about 30 μm. In an embodiment, the depth d2 of the second intaglio pattern portion IP12 may be about 25 μm. The depth d2 of the second intaglio pattern portion IP12 may be formed to be relatively large so as to prevent the printed pattern layer PP (refer to FIG. 6) that overlaps the outer bezel area BA2 from being removed in the case where only the single tone printing process is performed.

Figure 8:
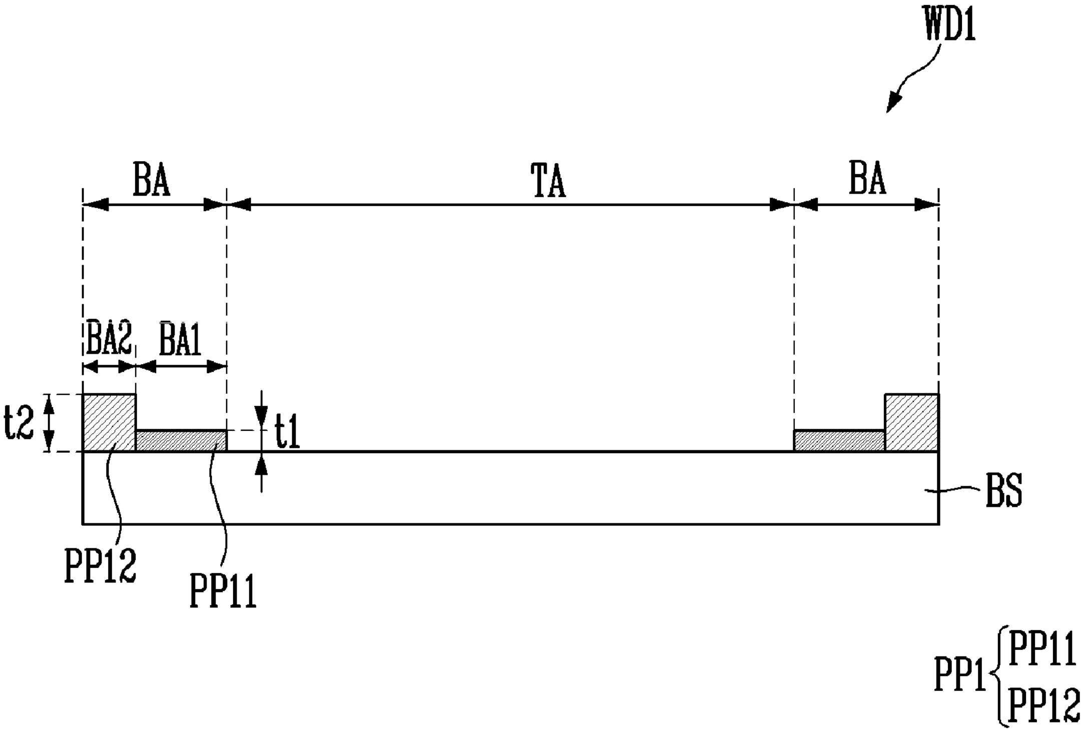
FIGS. 8 and 9 are schematic diagrams of a window in accordance with an embodiment.

In an embodiment, the sum of the width w1 of the first intaglio pattern portion IP11 and the width w2 of the second intaglio pattern portion IP12 may be the same as the width of the bezel area BA (refer to FIG. 8).

In the case where the window WD is fabricated by using the etching plate BP1 in accordance with an embodiment, the printed pattern layer PP (refer to FIG. 6) that overlaps the outer bezel area BA2 may be prevented from being removed in the case where only the single tone printing process is performed so that the defect rate may be reduced.

FIGS. 8 and 9 are schematic diagrams of the window WD1 in accordance with an embodiment.

The window WD1 illustrated in FIGS. 8 and 9 may be fabricated by performing the filling process S100, the attachment process S200, and the transfer process S300 two times (refer to FIGS. 3 to 5). For example, the window WD1 may be fabricated by the above-mentioned single tone printing process. However, there is a difference in that the etching plate BP of the filling process S100 illustrated in FIG. 3 is replaced with the etching plate BP1 illustrated in FIG. 7.

Referring to FIGS. 8 and 9, the window WD1 in accordance with an embodiment may include a stepped printed pattern layer PP1 overlapping the bezel area BA. The printed pattern layer PP1 may include a first printed pattern layer PP11 and a second printed pattern layer PP12. Although in FIGS. 8 and 9 the first printed pattern layer PP11 and the second printed pattern layer PP12 are illustrated in different colors, this is merely for convenience of distinguishing between the first printed pattern layer PP11 and the second printed pattern layer PP12. For example, the first printed pattern layer PP11 and the second printed pattern layer PP12 may be formed of printing ink INK including the same light-blocking material. For example, the first printed pattern layer PP11 and the second printed pattern layer PP12 may be formed of the same material.

The first printed pattern layer PP11 may be formed on the portion of the base substrate BS that corresponds to the inner bezel area BA1. The first printed pattern layer PP11 may overlap the inner bezel area BA1. The first printed pattern layer PP11 may have a certain thickness t1. The first printed pattern layer PP11 may be formed by transferring the printing ink INK charged into the first intaglio pattern portion IP11 having the certain depth d1 in the etching plate BP1 in accordance with an embodiment illustrated in FIG. 7.

As the first printed pattern layer PP11 is formed to overlap the inner bezel area BA1, defects caused by removal (or detachment) of the first printed pattern layer PP11 are not occurred or are minimized. Therefore, the thickness t1 of the first printed pattern layer PP11 may be less than a thickness t2 of the second printed pattern layer PP12.

The second printed pattern layer PP12 may be formed on the portion of the base substrate BS that corresponds to the outer bezel area BA2. The second printed pattern layer PP12 may overlap the outer bezel area BA2. The second printed pattern layer PP12 may have a certain thickness t2 greater than the thickness t1 of the first printed pattern layer PP11. The second printed pattern layer PP12 may be formed by transferring the printing ink INK charged into the second intaglio pattern portion IP12 having the certain depth d2 in the etching plate BP1 in accordance with an embodiment illustrated in FIG. 7.

As the second printed pattern layer PP12 is formed to overlap the outer bezel area BA2, there may be a significant defect caused by removal (or detachment) of the second printed pattern layer PP12. Therefore, the thickness t2 of the second printed pattern layer PP12 may be greater than the thickness t1 of the first printed pattern layer PP11. Thus, the rigidity of the second printed pattern layer PP12 may be increased, so that a defect rate caused by the removal (or detachment) of the second printed pattern layer PP12 may be reduced.

As such, the window WD1 in accordance with an embodiment may be fabricated by the single tone printing process, so that the production cost may be reduced. Furthermore, the thickness t2 of the second printed pattern layer PP12 that overlaps the outer bezel area BA2 may be formed to be as large as the thickness in case that the second printed pattern layer PP12 is formed by the double tone printing process, so that the defect rate caused by the single tone printing process may be reduced. Experimentally, in the window WD illustrated in FIG. 6, the defect rate caused by the removal (or detachment) of the printed pattern layer PP that overlaps the outer bezel area BA2 is about 1.55%. In the window WD1 in accordance with an embodiment, the defect rate caused by the removal (or detachment) of the second printed pattern layer PP12 is about 0.80%, so that the defect rate may be reduced by nearly two times.

Referring to FIG. 9, an adhesive layer AL may be disposed in the window WD1 in accordance with an embodiment. The window WD1 may be attached to the display module DM (refer to FIG. 1) by the adhesive layer AL. A process of attaching the window WD1 to the display module DM may be referred to as a lamination process. During the lamination process, due to a steep angle formed by the first printed pattern layer PP11 and the second printed pattern layer PP12, voids may occur in a junction between the first printed pattern layer PP11 and the second printed pattern layer PP12. For example, in the window WD1 including the stepped printed pattern layer PP1, the defect rate may increase due to occurrence of voids.

Furthermore, as the etching plate BP1 has the stepped intaglio pattern portion IP1 (refer to FIG. 7), the pressure to be applied to the pad PD during the attachment process S200 (refer to FIG. 4) may increase such that the pad PD may be damaged. As a result, there may be a problem in which the printing ink INK is incompletely printed during the printing process S300 (refer to FIG. 5).

Figure 10:
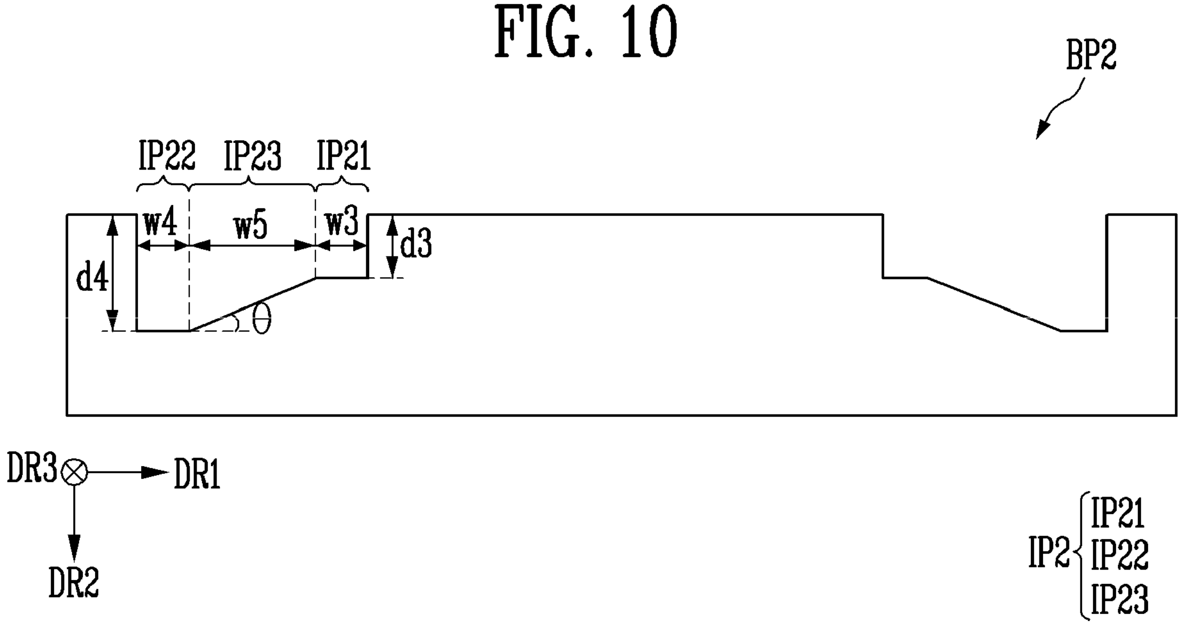
FIG. 10 is a schematic diagram of an etching plate in accordance with an embodiment.

FIG. 10 is a schematic diagram of an etching plate BP2 in accordance with an embodiment.

Referring to FIG. 10, the etching plate BP in accordance with an embodiment may include a slope-shaped intaglio pattern portion IP2. The intaglio pattern portion IP2 may include a third intaglio pattern portion IP21, a fourth intaglio pattern portion IP22, and a fifth intaglio pattern portion IP23.

The third intaglio pattern portion IP21 may have a width w3 defined in the first direction DR1, and a depth d3 defined in the second direction DR2, and may extend in the third direction DR3. The third intaglio pattern portion IP21 may be formed at a position spaced apart from an edge portion of the etching plate BP2 by a certain distance.

The width w3 of the third intaglio pattern portion IP21 may be the same as a width of a third printed pattern layer PP21 (refer to FIG. 11) that overlaps the inner bezel area BA1. The width w3 of the third intaglio pattern portion IP21 may be less than the width w1 of the first intaglio pattern portion IP11 illustrated in FIG. 7 due to the supplement of the fifth intaglio pattern portion IP23.

In an embodiment, the depth d3 of the third intaglio pattern portion IP21 may vary depending on an angle θ of the fifth intaglio pattern portion IP23. For example, as the angle θ of the fifth intaglio pattern portion IP23 increases, the depth d3 of the third intaglio pattern portion IP21 may be reduced. For example, as the angle θ of the fifth intaglio pattern portion IP23 decreases, the depth d3 of the third intaglio pattern portion IP21 may be increased. For example, the depth d3 of the third intaglio pattern portion IP21 may be in a range of about 10 μm to about 20 μm. In an embodiment, the depth d3 of the third intaglio pattern portion IP21 may be about 15 μm.

The fourth intaglio pattern portion IP22 may have a width w4 defined in the first direction DR1, and a depth d4 defined in the second direction DR2, and may extend in the third direction DR3. The fourth intaglio pattern portion IP22 may be formed at a position spaced apart from an edge portion of the etching plate BP2 by a certain distance.

The width w4 of the fourth intaglio pattern portion IP22 may be the same as a width of a fourth printed pattern layer PP22 (refer to FIG. 11) that overlaps the outer bezel area BA2. The width w4 of the fourth intaglio pattern portion IP22 may be the same as a width of the outer bezel area BA2.

In an embodiment, the depth d4 of the fourth intaglio pattern portion IP22 may be greater than the depth d3 of the third intaglio pattern portion IP21. For example, the depth d4 of the fourth intaglio pattern portion IP22 may be in a range of about 20 μm to about 30 μm. In an embodiment, the depth d4 of the fourth intaglio pattern portion IP22 may be about 25 μm. The depth d4 of the fourth intaglio pattern portion IP22 may be formed to be relatively large so as to prevent the printed pattern layer PP (refer to FIG. 6) that overlaps the outer bezel area BA2 from being removed in the case where only the single tone printing process is performed.

The fifth intaglio pattern portion IP23 may have a width w5 defined in the first direction DR1, and may be inclined at a certain angle θ between the third intaglio pattern portion IP21 and the fourth intaglio pattern portion IP22. For example, the fifth intaglio pattern portion IP23 may be formed in a slope shape having a certain angle θ.

The fifth intaglio pattern portion IP23 may extend in the third direction DR3. The fifth intaglio pattern portion IP23 may be formed at a position spaced apart from an edge portion of the etching plate BP2 by a certain distance.

The width w5 of the fifth intaglio pattern portion IP23 may be the same as a width of a fifth printed pattern layer PP23 (refer to FIG. 11) that overlaps the inner bezel area BA1.

Figure 11:
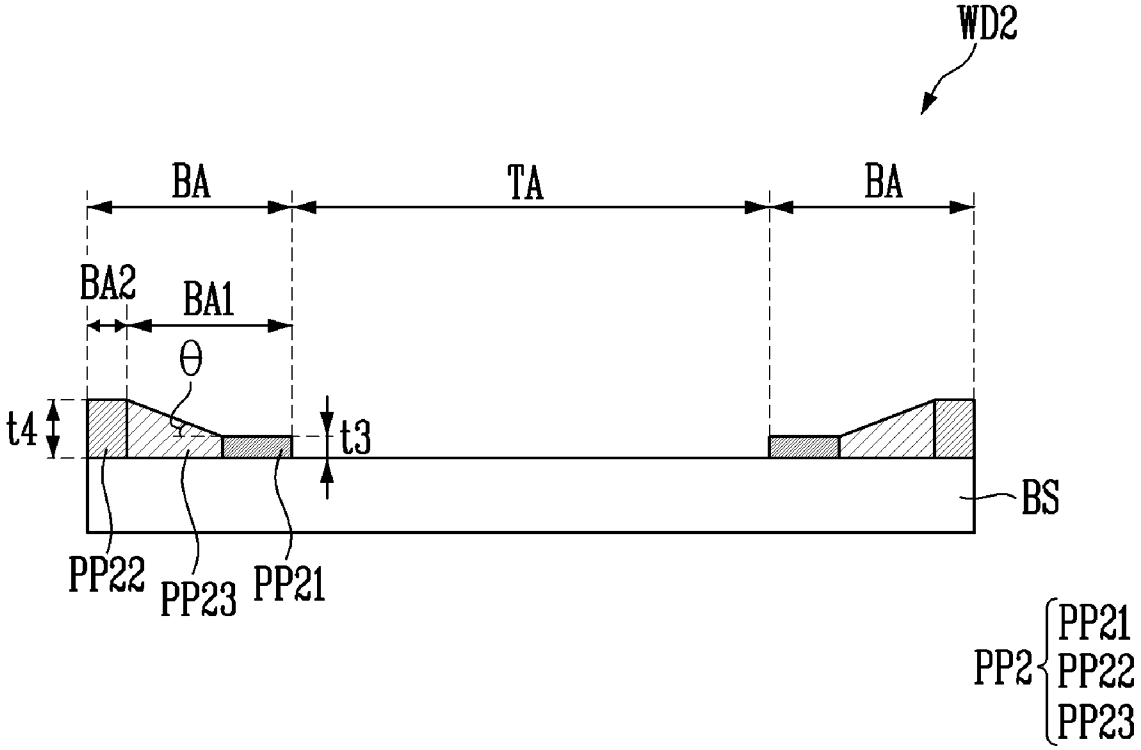
FIG. 11 is a schematic diagram of a window in accordance with an embodiment.

In an embodiment, the sum of the width w3 of the third intaglio pattern portion IP21 and the width w5 of the fifth intaglio pattern portion IP23 may be the same as the width of the inner bezel area BA1 (refer to FIG. 11). Furthermore, the sum of the width w3 of the third intaglio pattern portion IP21, the width w4 of the fourth intaglio pattern portion IP22, and the width w5 of the fifth intaglio pattern portion IP23 may be the same as the width of the bezel area BA (refer to FIG. 11).

In an embodiment, the angle θ (or an inclined angle) of the fifth intaglio pattern portion IP23 may be less than 90°.

As the fifth intaglio pattern portion IP23 is inclined at the certain angle θ, the pressure applied to the pad PD during the attachment process S200 (refer to FIG. 4) may be reduced so that the pad PD may be prevented from being damaged. Thus, a problem in which the printing ink INK is incompletely printed during the printing process S300 (refer to FIG. 5) may be prevented from occurring.

Furthermore, as the fifth intaglio pattern portion IP23 is inclined at the certain angle θ, an angle formed between the printed pattern layers adjacent to each other becomes gentle or lower, so that voids may be prevented occurring in the junction between the printed pattern layers.

In the case where the window WD is fabricated by using the etching plate BP2 in accordance with an embodiment, the printed pattern layer PP (refer to FIG. 6) that overlaps the outer bezel area BA2 may be prevented from being removed in the case where only the single tone printing process is performed, so that the defect rate may be reduced. Furthermore, the pressure applied to the pad PD during the attachment process S200 (refer to FIG. 4) may be reduced, so that the defect rate caused by damage to the pad PD may be reduced. For example, as an angle formed between the adjacent printed pattern layers (refer to FIG. 9) is gentle or small, voids may be prevented from occurring on the junction between the printed pattern layers during the lamination process, leading to a reduction in the defect rate.

FIG. 11 is a schematic diagram of a window WD2 in accordance with an embodiment.

The window WD2 illustrated in FIG. 12 may be fabricated by performing the filling process S100, the attachment process S200, and the transfer process S300 two times (refer to FIGS. 3 to 5). For example, the window WD2 may be fabricated by the above-mentioned single tone printing process. However, there is a difference in that the etching plate BP of the filling process S100 illustrated in FIG. 3 is replaced with the etching plate BP2 illustrated in FIG. 10.

Referring to FIG. 11, the window WD2 in accordance with an embodiment may include a slope-shaped printed pattern layer PP2 overlapping the bezel area BA. The printed pattern layer PP2 may include a third printed pattern layer PP21, a fourth printed pattern layer PP22, and a fifth printed pattern layer PP23. Although the third printed pattern layer PP21, the fourth printed pattern layer PP22, and the fifth printed pattern layer PP23 of FIG. 11 are illustrated in different colors, this is merely for convenience of distinguishing between the third printed pattern layer PP21, the fourth printed pattern layer PP22, and the fifth printed pattern layer PP23. For example, the third printed pattern layer PP21, the fourth printed pattern layer PP22, and the fifth printed pattern layer PP23 may be formed of printing ink INK including the same light-blocking material. For example, the third printed pattern layer PP21, the fourth printed pattern layer PP22, and the fifth printed pattern layer PP23 may be formed of the same material.

The third printed pattern layer PP21 may be formed on a portion of the base substrate BS that corresponds to at least a portion of the inner bezel area BA1. The third printed pattern layer PP21 may overlap at least a portion of the inner bezel area BA1. The third printed pattern layer PP21 may have a certain thickness t3. The third printed pattern layer PP21 may be formed by transferring the printing ink INK charged into the third intaglio pattern portion IP21 having the certain depth d3 in the etching plate BP2 in accordance with an embodiment illustrated in FIG. 10.

As the third printed pattern layer PP21 is formed to overlap at least a portion of the inner bezel area BA1, defects caused by removal (or detachment) of the third printed pattern layer PP21 are not occurred or are minimized. Therefore, the thickness t3 of the third printed pattern layer PP21 may be less than a thickness t4 of the fourth printed pattern layer PP22.

The fourth printed pattern layer PP22 may be formed on the portion of the base substrate BS that corresponds to the outer bezel area BA2. The fourth printed pattern layer PP22 may have the certain thickness t4 greater than the thickness t3 of the third printed pattern layer PP21. The fourth printed pattern layer PP22 may be formed by transferring the printing ink INK charged into the fourth intaglio pattern portion IP24 having the certain depth d4 in the etching plate BP2 in accordance with an embodiment illustrated in FIG. 10.

As the fourth printed pattern layer PP22 is formed to overlap the outer bezel area BA2, there may be a significant defect caused by removal (or detachment) of the fourth printed pattern layer PP22. Therefore, the thickness t4 of the fourth printed pattern layer PP22 may be greater than the thickness t3 of the third printed pattern layer PP21. Thus, the rigidity of the fourth printed pattern layer PP22 may be increased, so that a defect rate caused by the removal (or detachment) of the fourth printed pattern layer PP22 may be reduced.

The fifth printed pattern layer PP23 may be formed between the third printed pattern layer PP21 and the fourth printed pattern layer PP22. The fifth printed pattern layer PP23 may be formed on a portion of the base substrate BS that corresponds to at least a portion of the inner bezel area BA1. The fifth printed pattern layer PP23 may overlap at least a portion of the inner bezel area BA1. The fifth printed pattern layer PP23 may be inclined at the certain angle θ. The fifth printed pattern layer PP23 may be formed by transferring the printing ink INK charged into the fifth intaglio pattern portion IP23 inclined at the certain angle θ in the etching plate BP2 in accordance with an embodiment illustrated in FIG. 10.

As the fifth printed pattern layer PP23 is inclined at the certain angle θ, an angle formed between the adjacent printed patterns may be gentle or small. For example, an angle formed between the third printed pattern layer PP21 and the fifth printed pattern layer PP23, and an angle formed between the fourth printed pattern layer PP22 and the fifth printed pattern layer PP23 may be gentle or small. Therefore, during the lamination process, voids may be prevented from occurring in an area where the third printed pattern layer PP21 and the fifth printed pattern layer PP23 are adjacent to each other, or in an area where the fourth printed pattern layer PP22 and the fifth printed pattern layer PP23 are adjacent to each other.

As such, the window WD2 in accordance with an embodiment may be fabricated by the single tone printing process, so that the production cost may be reduced. Furthermore, the thickness t4 of the fourth printed pattern layer PP22 that overlaps the outer bezel area BA2 may be formed to be as large as the thickness in case that the fourth printed pattern layer PP22 is formed by the double tone printing process, so that the defect rate caused by the single tone printing process may be reduced. Furthermore, as the slope-shaped printed pattern layer PP2 is formed, the defect rate caused by occurrence of voids in the window WD2 in accordance with an embodiment may be reduced.

In accordance with an embodiment, a defect rate caused by removal (or detachment) of ink (or a printed pattern layer) during a process of fabricating a window may be reduced.

In accordance with an embodiment, a defect rate caused by occurrence of voids during a lamination process may be reduced.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. An etching plate comprising:
a first intaglio pattern portion spaced apart from an edge portion of the etching plate, the first intaglio pattern portion having a first depth; and
a second intaglio pattern portion adjacent to the first intaglio pattern portion, the second intaglio pattern portion having a second depth greater than the first depth of the first intaglio pattern portion,
wherein the second intaglio pattern portion is at an outer periphery of an entirety of the first intaglio pattern portion,
wherein the first intaglio pattern portion and the second intaglio pattern portion contact each other, and
wherein the first intaglio pattern portion and the second intaglio pattern portion are configured to form a bezel area of a window.

2. The etching plate according to claim 1, wherein
a width of the first intaglio pattern portion is substantially equal to a width of an inner bezel area of the bezel area of the window, and
a width of the second intaglio pattern portion is substantially equal to a width of an outer bezel area of the bezel area of the window.

3. An etching plate comprising:
a first intaglio pattern portion spaced apart from an edge portion of the etching plate, the first intaglio pattern portion having a first depth;
a second intaglio pattern portion adjacent to the first intaglio pattern portion, the second intaglio pattern portion having a second depth greater than the first depth of the first intaglio pattern portion; and
a third intaglio pattern portion formed between the first intaglio pattern portion and the second intaglio pattern portion, a lower surface of the third intaglio pattern portion is continuously inclined at an angle,
wherein the first, second, and third intaglio pattern portions are configured to form a bezel area of a window.

4. The etching plate according to claim 3, wherein
a sum of a width of the first intaglio pattern portion and a width of the third intaglio pattern portion is substantially equal to a width of an inner bezel area of the bezel area of the window, and a width of the second intaglio pattern portion is substantially equal to a width of an outer bezel area of the bezel area of the window.

5. The etching plate according to claim 1, wherein the first depth is in a range of about 10 μm to about 20 μm, and the second depth is in a range of about 20 μm to about 30 μm.

6. The etching plate according to claim 3, wherein the angle is less than 90°.

* * * * *